July 4, 1933. D. D. COREY 1,916,715
DIFFERENTIAL BALANCING MEANS
Filed July 29, 1932  2 Sheets-Sheet 1

INVENTOR
Dana D. Corey
BY
Smith & Tuck
ATTORNEYS

July 4, 1933. D. D. COREY 1,916,715
DIFFERENTIAL BALANCING MEANS
Filed July 29, 1932 2 Sheets-Sheet 2

INVENTOR
Dana D. Corey
BY
Smith & Tuck
ATTORNEYS

Patented July 4, 1933

1,916,715

UNITED STATES PATENT OFFICE

DANA D. COREY, OF SEATTLE, WASHINGTON

DIFFERENTIAL BALANCING MEANS

Application filed July 29, 1932. Serial No. 626,087.

My present invention relates to the art of automotive transmissions and more particularly to a differential balancing means.

Ever since the conception of the automobile it has been recognized that there is an outstanding deficiency in the manner that the driving force is applied to the rear axle of a car, or as in some of the newer types to either the front axle or all four wheels through differential gearing. This form of gearing has been found necessary to enable a car to negotiate turns. However, it also has the fault that if one wheel on the differential axle spins, through lack of traction, all the power of the motor is expended on that one wheel and no movement of the car results. In the truck field particularly, this is very unsatisfactory and many locking devices have been provided for locking the differential under conditions where one wheel has lost its traction. These devices have the inherent fault, however, of requiring manual operation. They add considerably to the cost of the assembly and if left in their locked position inadvertently, often times cause either severe accidents or the breakage of some parts of the transmision.

In my present device I provide means whereby a limited amount of differential action is possible after which the driving effort is transferred from the spring wheel to the wheel having traction somewhat after the fashion of the locking differential yet this balancing occurs automatically without attention from the part of the driver and when the condition causing the spinning of one wheel has been overcome the normal functioning of the differential gearing is not interfered with. This particular problem itself has been attacked by many designers and many transmission arrangements have been proposed most of which however depend upon a very great increase in the friction between gears of the differential gearing. This is objectionable in that the life of such gearing is necessarily short. In my present arrangement, differential gearing of standard design is used and no increased frictional load is placed upon the same. Therefore the principal object of my present invention is to provide a differential balancing means which will operate without attention from the driver.

A further object of my invention is to provide a differential balancing means which will permit normal differential action yet when one wheel begins to spin will effectively retard the unwanted rotation and apply the power of the motor to both wheels of the axle.

A further object of my invention is to provide means whereby my device will at all times be provided with an abundance of the necessary lubricant.

Other and more specific objects will be apparent from the following description taken in connection with the accompanying drawings, wherein Figure 1 is a cross sectional view through a differential using my balancing means, the same being cut on the vertical plane passing through the drive shaft of the car.

Figure 1:
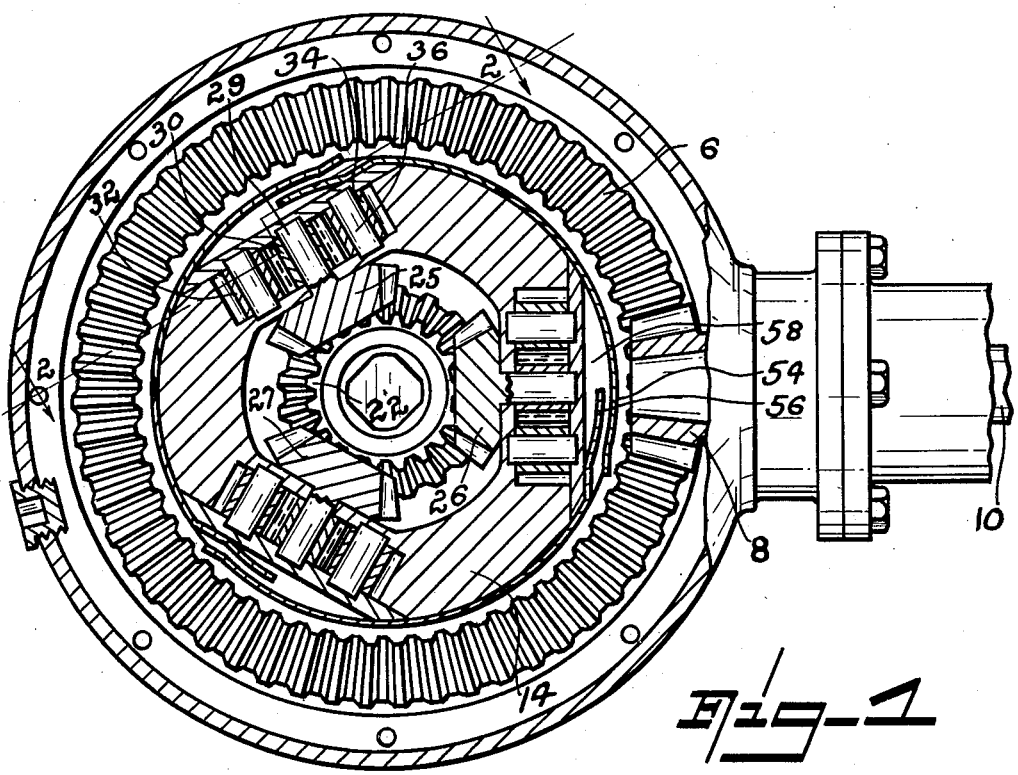

Referring to the drawings, throughout which like reference characters indicate like parts, 6 designates the usual ring gear of a rear axle assembly. 8 indicates the driving pinion which is normally secured to the drive shaft 10 and imparts the driving effort of the motor to the ring gear. The ring gear is suitably secured after the well known fashion to one portion of a differential housing 12. This housing may be made up along conventional lines. In the present instance as a matter of clearness I have shown it as formed of three separate units which are secured together. These units consist of the central member 14 and the end member 16. Members 12 and 16 are arranged to be suitably engaged by the axle bearings 18 and 20 after a manner well known in this form of construction. They also support the axle shaft gears 22 and 24 respectively which in turn are secured in driving relationship to the axle members 26 and 28. This form of construction is well known in the automotive field and is shown and described to bring out clearly that my present arrangement for balancing the differential action, employs in a large degree the standard parts so that balancing means may be employed in any of the normal types of transmissions now being used. Disposed between axle gears 22 and 24 after the usual plan are the planet gears 25, 26 and 27. In my showing I have illustrated three of these gears, my device however would be operatable with two or more than three gears equally as well.

From this point my construction varies considerably from the usual rear end construction. Normally the planet gears such as 25, 26 and 27 are free to rotate upon a spider. That is partly true in the present instance. In other words, the gears are provided with an outwardly extending shaft portion 29 which is provided with suitable bearings formed within housing member 14, it being supported by one bearing abutting the gear and another bearing in which the end of shaft 29 is journaled. Secured to shaft 29 is a small gear 30. The exact type of this gear is unimportant, it may be a straight spur gear as indicated, it might be a spiral gear or might take any of the unusual gear forms employed in gear pumps. Adapted to engage in interlocking relationship with gear 30 are one or more driven gears as 32, 34, etc. In my illustrations I have shown each gear 30 as driving two idle gears as 32 and 34 altho it is believed that it will be apparent it could drive only one of the gears or might drive any number that can be inserted in the differential housing. Gears 32 and 34 are intended to float freely upon their supporting shafts 36. They are not required to drive anything, merely acting in the capacity of gears forming part of a gear pump train.

The operation of my device as shown is predicated on the premise that the oil or grease used in the rear end of a car is somewhat compressible. Now most oils so used are slightly compressible. However they become increasingly compressible as they are agitated and caused to pick up and include small particles of air. This is what gives the frothy appearance to the grease in the rear end of a car that has been driven for some time.

If rear end greases however should be developed which are not compressible or if for some particular use it were desirable to use my device with water for instance, which would be non-compressible, it will be necessary to conduct certain experiments to determine the amount of clearance required between the gear teeth and the end of the gears in order to provide sufficient passageway so that the device could never be actually locked. It might even be necessary to provide actual channels so as to prevent the locking of the gearing. It has been found that even under the most accurate machine operations in order to have reasonable clearance for satisfactory operation of a gear pump that a certain leakage will occur and up to the present this has been found sufficient without providing any definite channels. For this reason I have preferred to avoid describing my differential as being locking in any sense. It must not lock and it cannot lock as long as it is possible for the fluids to pass the gear pump arrangement. Even tho the clearance is very slight when sufficient pressure is built up the oil can be forced through the small space provided by even rather a close machining tolerance.

In operating my device, following the plan of all differential gearing, there is no movement of the planet gears about their axes of rotation as long as the axles, as 26 and 28, travel at the same angular speed.

Figure 2:
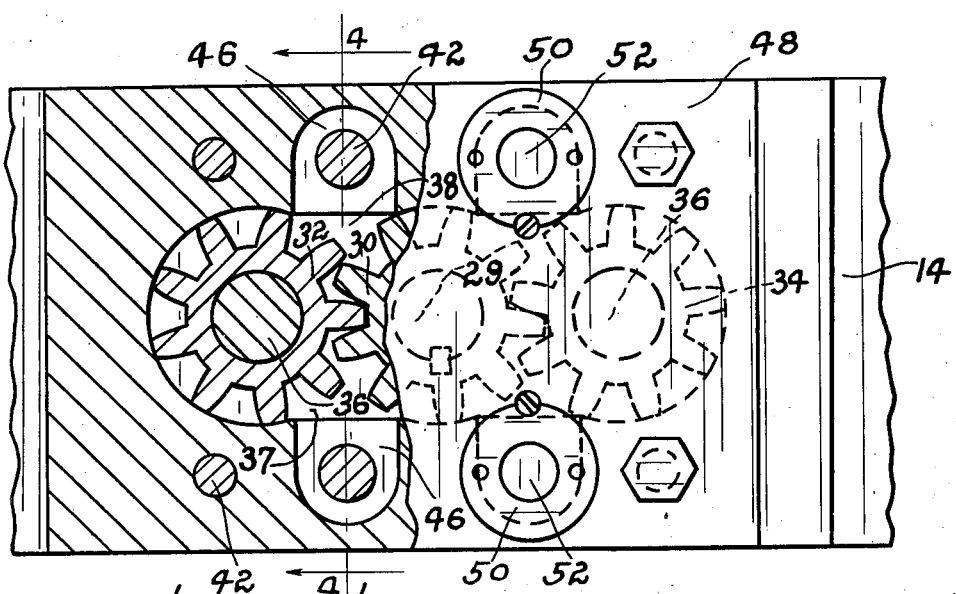
Figure 2 is a fragmentary cross sectional view along line 2—2 of Figure 1.
Figure 3:
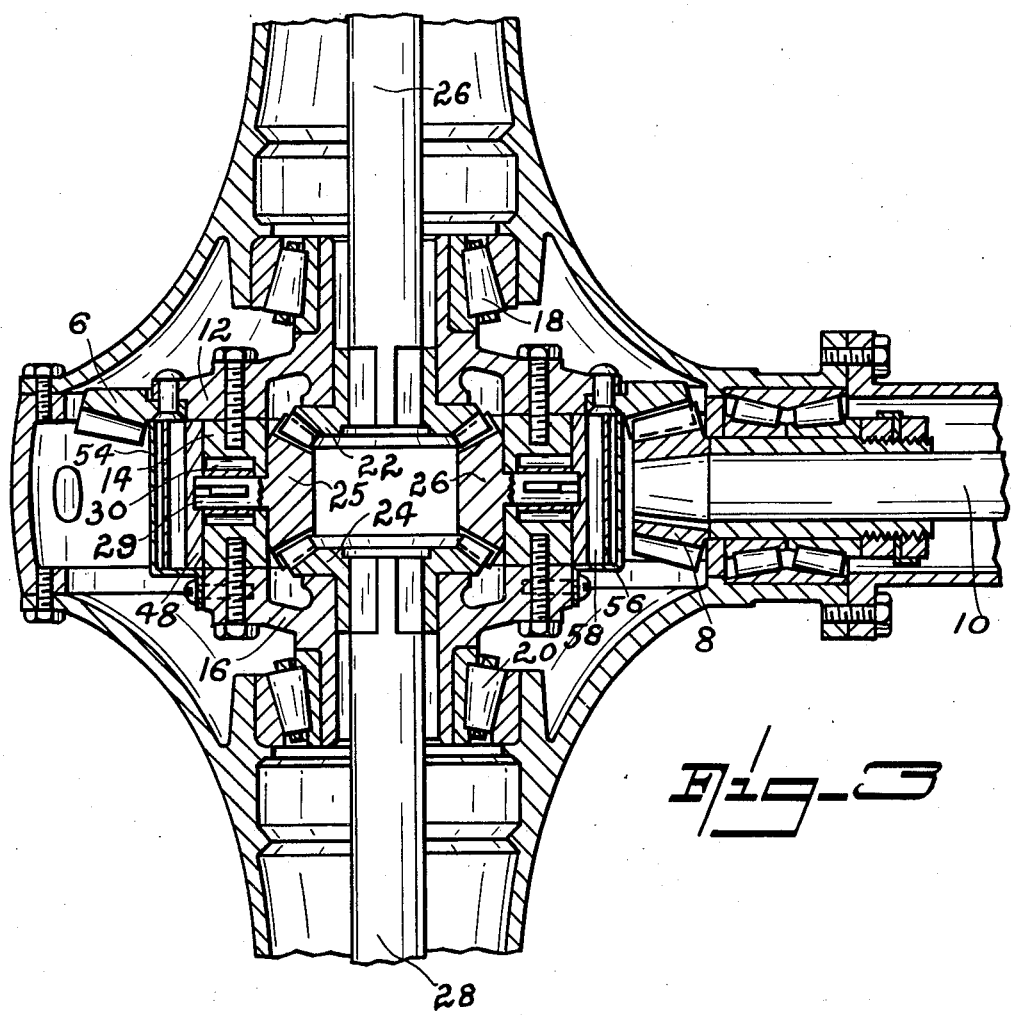
Figure 3 is a cross sectional view taken at right angles to Figure 1 through a differential as in Figure 1, the cutting plane including the two axle shafts and the drive shaft.
Figure 4:
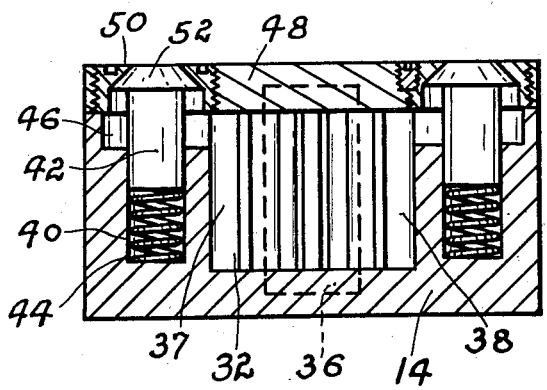
Figure 4 is a fragmentary sectional view taken along the line 4—4 of Figure 2.

However when one shaft travels faster than the other the gears must revolve to compensate for this relative speed displacement. When this occurs gears 30 will be revolved by their connected planet gears and this in turn will revolve all the pump gears connected in operating relationship with gears 30 referring now to Figure 2, specifically to gears 30 and 32. If the gears are driven so that gear 30 revolves in a clock wise direction as viewed in Figure 2 there will be a tendency for the oil to be forced from compartment 37 to compartment 38. However the clearance between the ends of the gear and the housing is kept to rather narrow tolerance as is the clearance between the teeth. As a result the first action of the pump is to compress the oil in these relatively small chambers and then to gradually force it over to the other compartment through the restricted clearance. Now this clearance must be rather accurately proportioned as must also the size or volume of chambers 37 and 38, inasmuch as it is desired not to restrict the movement of gears 30 and their attached planet gears until one shaft as 28 has progressed considerably beyond the other shaft as 26. This is to enable the differential to easily operate as normally intended when making turns around corners and the like yet when one wheel loses its traction and would normaly tend to spin at a high rate of speed. The retarding action of the oil flow will prevent this and thus place the power on the wheel or wheels, if a four wheel unit is being considered which does have firm traction. It will be apparent it is believed that the amount of the retarding action thus provided will depend entirely upon the number of pump units employed in the differential. In my present construction I have shown six. In other words two pump units for each of the planet gears. It is believed it will be apparent that by suitable gearing additional units might be installed and thus increase this retarding action. On other cases, particularly light cars, it might be necessary only to have one or two such units as described.

It has been found by actual trial that there is considerable displacement of the oil and it is necessary to re-supply any oil which has been so displaced, otherwise a reversal of the action would find no resistance. To overcome this deficiency I have provided an oil feeding and valving arrangement.

Within housing 14 I have provided a valve guide and spring pocket at 40. This is adapted to accommodate the valve stem 42 and the valve spring 44. At its upper extent valve guide 40 is enlarged as at 46 in a manner best illustrated possibly in Figure 2.

Each of the pump units is provided with a cover plate as 48 which seals the outer end of the pump gears and provides journals for their supporting shafts. Screwed into cover plate 48 I provide a removable valve seat as 50 which provides a proper seat for the valve proper 52. This valve with its stem 42 and spring 44 provides a check valve arrangement which permits grease to be sucked in at the valve, the valve operating as an automatic valve, but prevents grease getting out of the gear chamber. I provide two such valves for each pump unit as one of the other side of the two gears, take for instance 30 and 32, will have alternate suction and compression on it.

It is necessary to further assure that an adequate supply of grease will at all times be resting on valve 52. To assure this I have provided, preferably formed of sheet metal, the grease scoop 54 and another sheet metal member as 56 which act to form a labyrinth seal and to retain a full chamber full of grease at 58. As shown in Figure 1 the sheet metal scoop is arranged so as to pick up grease or oil when the car is being driven in its forward position. As this is the usual direction of rotation of the ring gear, and the scoop is secured to it indirectly, there is little question of chamber 58 being constantly filled with grease and if any is drawn off by the pump thru valve 52 it will be immediately refilled by the scooping action of member 54.

The foregoing description and the accompanying drawings are believed to clearly disclose a preferred embodiment of my invention but it will be understood that this disclosure is merely illustrative and that such changes in the invention may be made are fairly within the scope and spirit of the following claims.

Having thus fully described my invention, what I claim as new and desire to secure by Letters Patent is:—

1. In a balancing means for differential transmission mechanism, the combination with an axle housing and a differential housing therein, and planetary gearing in the latter housing, of a gear-pump unit complementary to and operated by each planetary gearing, means for circulating oil to said pump units including collector scoops mounted on the differential housing, said units having opposed pump chambers, and spring actuated check valves controlling flow of oil to said chambers.

2. The combination with an axle housing forming an oil chamber, a drive shaft, driven shafts, a differential housing including a central hub and a ring gear rigid therewith and planetary gearing mounted in the central hub, of complementary gear-pump units mounted in recesses in the hub and operated by said planetary gearing, and an annular collector band mounted on the hub, having inlet ports for feeding oil to each pump-unit.

In witness whereof, he has hereunto subscribed his name this 23rd day of July A. D. 1932.

DANA D. COREY.